Patented Apr. 5, 1938

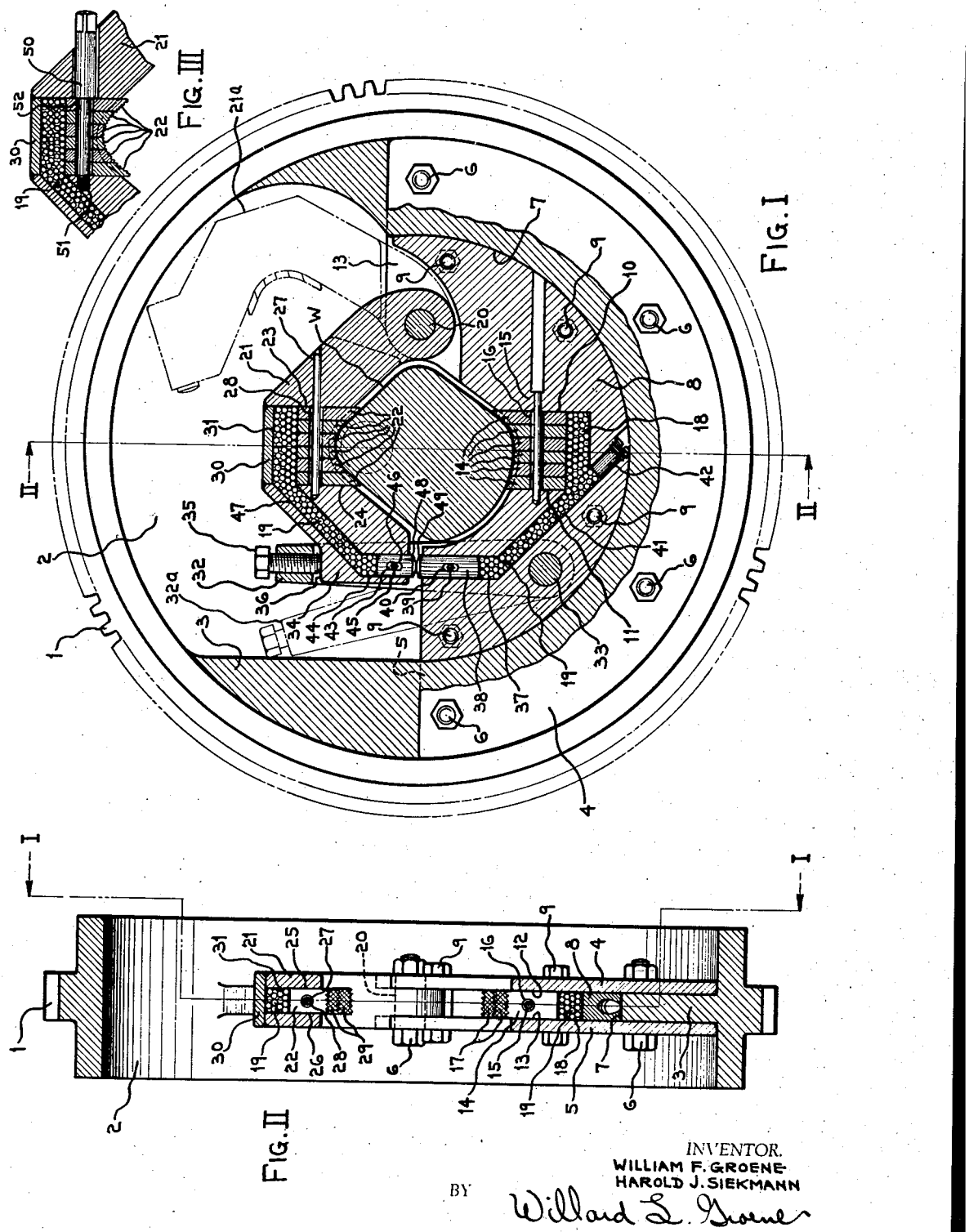
April 5, 1938. W. F. GROENE ET AL 2,113,509
CRANKSHAFT CHUCK
Filed March 23, 1937
INVENTOR.
WILLIAM F. GROENE
HAROLD J. SIEKMANN
BY Willard L. Groene
ATTORNEY.

2,113,509

UNITED STATES PATENT OFFICE 2,113,509

CRANKSHAFT CHUCK

William F. Groene and Harold J. Siekmann, Cincinnati, Ohio, assignors to The R. K. Le Blond Machine Tool Company, Cincinnati, Ohio, a corporation of Delaware Application March 23, 1937, Serial No. 132,506

21 Claims. (Cl. 82—40)

This invention pertains to chucks for gripping irregular, rough-surfaced work pieces which have been properly prelocated with respect to the axis of rotation of the chuck. More particularly this invention pertains to chucks for gripping the rough surfaces of webs of crankshafts to be chucked and rotated in a crankshaft lathe, for instance, of a character shown in Patent Number 2,069,107 issued January 26, 1937.

It has long been a difficult problem to chuck a rough irregular surfaced precentered work piece and maintain said work piece during machining operations in its proper precentered position in the lathe. Particularly is the problem difficult in lathes of the center drive type wherein the work is first placed on the usual lathe centers and the center drive chuck then applied to the work intermediate said centers. In such instances the chuck is found to invariably axially displace the work piece from true centered position which causes the machining operations on the work to be inaccurate when the work is again unchucked. Various forms of equalizing chucking devices have been suggested to meet this problem but all have been defective because any chuck which has equalizing characteristics can not positively hold work against axial distortion caused by the cutting tools, such distortion being particularly encountered in the turning of crankshafts.

We have overcome the defects of the devices heretofore used in that we have provided a chucking device which is equalizing in its initial engagement with the work but which automatically becomes a positive supporting, locating, and driving chuck upon final engagement with the work thereby maintaining the work at all times in accurate precentered position.

The chief object of our invention is to provide a chuck which is adapted to engage a precentered work piece in a lathe by means of rough irregular surfaces thereof in such a way as to securely support, locate, and drive said work piece while maintaining it at all times in its proper precentered position.

A further object is to construct a chuck having a series of compensating plungers mounted on the work spindle and a second series of compensating plungers movable relative to said first mentioned plungers whereby a rough surfaced precentered work piece may be gripped between said series of plungers without distorting said work piece from its true precentered position.

Another object is to provide in a chuck adapted to engage rough surfaces of a precentered work piece without distorting it from said precentered position, a series of compensating plungers mounted on the chuck body to one side of the axis of rotation of the chuck, a second series of compensating plungers adapted to be bodily moved relative to said first mentioned series of plungers whereby said work piece may be gripped between said series of plungers, and interconnecting means between both of said series of plungers so that equalizing action may take place between said series of plungers during the initial engagement of the work and chuck and so that upon final engagement of said chuck and work piece the work piece will be supported, located, and driven in a positive manner in its true precentered position.

And a still further object is to provide in a chuck adapted to engage rough surfaces of a precentered work piece without distorting it from said precentered position, a series of compensating plungers mounted on the chuck body to one side of the axis of rotation of the chuck, a second series of compensating plungers adapted to be bodily moved relative to said first mentioned series of plungers whereby said work piece may be gripped between said series of plungers, interconnecting means between both of said plungers so that equalizing action may take place between said series of plungers during engagement of the work and chuck, and means for locking said plunger against further movement after the chuck has properly engaged the work piece whereby said work piece is positively supported, located, and driven while accurately maintained in its true precentered position.

Further objects will appear from a description of the drawing, in which:

Figure I is an axial view, partly in section on line I—I of Figure II, of a center drive ring gear chuck embodying the principles of our invention.

Figure II is a transverse section through the chuck on the line II—II of Figure I.

Figure III is section on the line I—I of Figure II showing a portion of the clamp with locking mechanism for the plungers associated therewith.

Our invention is shown applied to a ring gear 1 of a center drive work spindle having an axial bore 2 through which work may be axially loaded into or out of the ring gear 1 manually, or by mechanical means, for example, as illustrated in Patent Number 1,700,721 issued January 29, 1929.

To the inner annular rib 3 of the ring gear 1 are fixed the side plates 4 and 5 by suitable bolts 6 passing through the plates and the rib 3. Nicely fitting in the arcuate portion 7 of the bore 2 and nicely fitting between the side plates 4 and 5 is the segmental member 8 which is secured in such position by suitable bolts 9 passing through the side plates 4 and 5 and the member 8.

In a slot formed by the surfaces 10 and 11 in the member 8 and the inner surfaces 12 and 13 of the respective side plates 4 and 5 is slideably mounted a series of compensating plungers 14 adapted to move substantially radially of the axis of rotation of the chuck. A retaining pin 15 fixed in the member 8 and passing through clearance holes 16 in each of the plungers 14 serves to retain them in the member 8 while at the same time providing ample freedom of movement of the plungers to allow their serrated ends 17 to properly engage the rough irregular surfaces of the periphery of the web W of a crankshaft. Behind the plungers 14 is a chamber 18 containing a compensating pressure receiving medium such as hydraulic fluid, a semiliquid, or metallic balls or shot 19 as shown in this exemplary embodiment.

On the pin 20 fixed in the side plates 4 and 5 is pivotally mounted the clamp 21 which has the compensating plungers 22 slideably mounted in a slot formed by the surfaces 23, 24, 25, and 26 in the clamp 21 for movement substantially radially of the axis of rotation of the chuck. A retaining pin 27 fixed in the clamp 21 and passing through clearance holes 28 in each of the plungers 22 serves to retain them in the clamp 21 while at the same time providing ample freedom of movement of the plungers to allow their serrated ends 29 to properly engage the web W. A plate 30 is welded over the slot for the plungers 22 to thereby form a chamber 31 containing compensating pressure receiving medium 19 similar to that utilized in the chamber 18 for the plungers 14.

In order to secure the clamp 21 over the web W, as shown in Figure I, a bifurcated latch 32 is pivotally mounted on the pin 33 fixed in the side plates 4 and 5 and is adapted to be swung over the outer end portion 34 of the clamp 21 and having a screw 35, threaded in said latch adapted to be tightened down on the surface 36 of end 34 thereby swinging said clamp 21 toward the work and axis of rotation of the chuck. When loading or unloading work in the chuck the latch 32 and clamp 21 are swung to the respective positions indicated at 32a and 21a.

A unique feature of the invention is that the chambers for the plungers 14 and 22 are interconnected so that not only are the plungers 14 compensating or equalizing relative to each other and the plungers 22 compensating or equalizing relative to each other but also both of the series of plungers 14 and 22 are compensating or equalizing relative to each other. In a suitable bore 37 in the member 8 is slideably mounted a plunger 38 which is retained therein by a pin 39 fixed in the member 8 and passing through the slot 40 in the plunger 38 whereby said plunger 38 is properly maintained in the bore 37 while at the same time allowing ample axial movement of said plunger for proper functioning of the chucking mechanism. A passage way 41 in the member 8 interconnects the chamber 18 and the bore 37 whereby the compensating pressure receiving medium 19 may contact the plungers 14 and the plunger 38 and is free to flow from chamber 18 to the bore 37, or vice versa. A suitable threaded plug 42 in the passageway 41 provides means for charging and maintaining the pressure receiving medium 19 in the chamber 18, bore 37, and passageway 41.

The plunger 43 is similarly mounted as the plunger 38, for axial movement in the bore 44 in the clamp 21 which is retained therein by a pin 45 fixed in the clamp 21 and passing through the slot 46 in the plunger 43 whereby said plunger 43 is properly maintained in the bore 44 while at the same time allowing ample axial movement of said plunger for proper functioning of the chucking mechanism. A passageway 47 in the clamp 41 interconnects the chamber 31 and the bore 44 whereby the compensating pressure receiving medium 19 may contact the plungers 22 and the plunger 43 and is free to flow from chamber 31 to the bore 44, or vice versa. The outer ends 48 and 49 of the respective plungers 38 and 43 are arranged to abut against each other when the clamp 21 is swung over the web W as shown in Figure I.

In the operation of the chuck the work piece, constituting in this exemplary disclosure a crankshaft having a web W, is preferably precentered in the lathe to which this chuck is applied by means independent of the chucking device, such as the usual lathe centers provided for each end of the work piece. While the work piece is so held the clamp 21 is swung over the work piece from position 21a and the latch 32 swung over the clamp 21 from position 32a. The screw 35 is then tightened down against the surface 36 of the clamp 21 thereby powerfully urging the clamp toward the web W and the member 8 the result of which is to bring the plungers 22 into engagement with the web W of the precentered work piece, each of said plungers 22 seating its serrated end 29 properly against the web W. Further tightening of the screw will cause the clamp 21 to move still further toward the work piece and member 8 while the plungers 22 are held against such movement by the web W of the precentered work piece. Under these conditions the chamber 31 will be reduced in size as the plungers 22 are moved relatively upwardly (Figure I) in the clamp 21, the result of which is to displace some of the compensating pressure receiving medium 19 from chamber 31 through passageway 47 into the bore 44 whereby the plunger 43 is moved downwardly and, since it abuts against the plunger 38, causes downward movement of the plunger 38 in the bore 37. Some of the compensating pressure receiving medium 19 is thus displaced from the bore 37 through passageway 41 into chamber 18 which causes the plungers 14 to be raised upwardly and to each seat their serrated ends 17 properly against the web W in opposition to the plungers 22. It can thus be seen that further tightening of the screw 35 will securely seat the series of plungers 14 and 22 positively against the work piece as no compensating pressure medium 19 can escape from either the member 8 or the clamp 21. And furthermore, the work piece web W will not be displaced from its true precentered position by any irregularity or roughness of its surface to which the plungers 14 and 22 are applied as this is automatically compensated for when tightening the screw 35 by relative axial movement of the abutting plungers 38 and 43.

The selection of the compensating pressure receiving medium should be one which forms substantially a solid abutment for the plungers 14 and 22 so that none of these plungers can move relative to others of said plungers when the work is fully clamped up in the chuck. We have preferably shown the use of metallic balls or shot 19 as we find this material meets the above requirements admirably. Beeswax or semi-hard rubber are equally good substitutes for the shot, particularly in instances where the plungers 14 and 22 have their serrated ends shaped to conform approximately to the rough surface to be gripped, as shown in Figure I, thereby minimizing the displacement and rearrangement of the compensating pressure receiving medium in clamping the work in the chuck.

In instances where it is desirable to use a free flowing liquid, such as oil, as the compensating pressure receiving medium it is desirable to provide a clamping bolt 50 substantial as shown in Figure III which has a threaded end 51 screwed into the cap 21 and passing through the clearance holes 28 in the plungers 22. A shoulder 52 is provided on the screw 50 which bears against the face of the plunger furthest removed from the threaded end 51 whereby tightening of the screw 50 after the screw 35 has been fully tightened down will securely lock all of plungers 22 to the surface 24 of the cap 21 to thereby prevent individual movement of the plungers 22. When loosened, the bolt 50 functions as the pin 27 in Figure I. While the device will work satisfactorily with a bolt for the one series of plungers 22 it is preferable to use a bolt similarly in place of the pin 15 for the plungers 14 where heavy cutting is to be done.

While we have here illustrated and described one form of our invention it is to be clearly understood that we are not limited to the precise construction or use herein shown, but what we claim as new and desire to secure by United States Letter Patent is:—

1. A gripping device comprising jaws movable relative to each other, each of said jaws comprising individually movable gripping elements and a carrier means therefor, a chamber formed by portions of said gripping elements and of said carrier means, and a medium in said chamber, capable of adapting itself to all shapes of said chamber, acting as a rigid abutment, and inter-connecting means for the chambers to permit flow of said medium between said chambers.

2. A gripping device comprising a pair of jaws movable in opposite directions relative to each other, each of said jaws comprising individually movable gripping elements and a carrier means therefor, a chamber formed by portions of said gripping elements and of said carrier means, and a medium in said chamber capable of adapting itself to all shapes of said chamber, acting as a rigid abutment, and inter-connecting means for the chambers to permit flow of said medium between said chambers.

3. A gripping device comprising jaws movable relative to each other, a carrier member for each of said jaws, chambers formed by portions of said jaws and of said carrier members, a medium in said chambers, capable of adapting itself to all shapes of said chamber, acting as a rigid abutment, and inter-connecting means for said chambers whereby said medium may flow between said chambers.

4. A gripping device comprising a pair of oppositely moving jaws, a carrier member for each of said jaws, chambers formed by portions of said jaws and said carrier members, a medium in said chambers, capable of adapting itself to all shapes of said chambers, acting as a rigid abutment, means for moving one of said carriers relative to a member to be gripped, and inter-connecting means for said chambers whereby said medium may flow between said chambers to equalize the gripping action of both of said jaws upon said member to be gripped.

5. A gripping device comprising a plurality of jaws movable relative to a member to be gripped, carrier members for said jaws, chambers formed by portions of said jaws and said carrier members, a medium in said chambers, capable of adapting itself to all shapes of said chambers, acting as a rigid abutment, means for moving said carriers relative to said member to be gripped, and inter-connecting means for said chambers whereby said medium may flow between said chambers to equalize the gripping action of said jaws upon said member to be gripped.

6. A gripping device comprising a pair of jaws movable relative to each other from opposite directions to engage a member to be gripped, each of said jaws comprising individually movable gripping plungers, a carrier means therefor, a chamber formed by portions of said gripping plungers and of said carrier means, and a medium in said chamber, capable of adapting itself to all shapes of said chamber, acting as a rigid abutment, and inter-connecting means for said chambers whereby said medium may flow between said chambers to equalize the gripping action of all of said gripping plungers on said member to be gripped.

7. A gripping device comprising a plurality of jaws movable relative to a member to be gripped, each of said jaws comprising individually movable gripping plungers, a carrier means therefor, a chamber formed by portions of said gripping plungers and of said carrier means, and a medium in said chamber, capable of adapting itself to all shapes of said chamber, acting as a rigid abutment, and inter-connecting means for said chambers whereby said medium may flow between said chambers to equalize the gripping action of all of said gripping plungers on said member to be gripped.

8. In a gripping device for holding an irregular prelocated work piece, a plurality of jaws, carrier members for said jaws, chambers formed by portions of said jaws and said carrier members, a medium in said chambers, capable of adapting itself to all shapes of said chambers, acting as a rigid abutment, means for moving one or more of said carrier members relative to said work piece and inter-connecting means for said chambers whereby said medium may flow between said chambers to equalize the gripping action of said jaws upon said work piece whereby said work piece may be rigidly held in prelocated position.

9. In a gripping device for holding an irregular prelocated work piece, a plurality of jaws each comprising individually movable gripping plungers, a carrier means therefor, a chamber formed by portions of said gripping plungers and of said carrier means, and a medium in said chamber, capable of adapting itself to all shapes of said chamber, acting as a rigid abutment, means for moving one or more of said jaws relative to said work piece, and inter-connecting means for said chambers whereby said medium may flow between said chambers to equalize the gripping action of each of said plungers upon said work piece whereby said work piece may be rigidly held in prelocated position.

10. In a gripping device for holding an irregular prelocated work piece without distortion, jaw carrying members, some fixed and others movable relative to said prelocated work piece, jaws in said members movable relative to said work piece, chambers formed by portions of said jaws and of said carrier members, a medium in said chambers, capable of adapting itself to all shapes of said chambers, acting as a rigid abutment, and interconnecting means for said chambers whereby said medium may flow between said chambers to equalize the gripping action of said jaws upon said work piece when some of said jaw carrying members are moved toward the work piece whereby said work piece may be rigidly held in prelocated position.

11. In a gripping device for holding an irregular prelocated work piece without distortion, a series of compensating plungers movable relative to said work piece, a carrier member for said plungers fixed relative to said prelocated work piece, a second series of compensating plungers movable relative to said work piece in opposed relation to said first mentioned plungers, a carrier member for said second series of plungers movable relative to said work piece, chambers formed by portions of said jaws and of said carrier members, a medium in said chambers, capable of adapting itself to all shapes of said chambers, acting as a rigid abutment, means for moving said movable carrier member toward said work piece, and inter-connecting means for said chambers whereby said medium may flow between said chambers to effect an equalizing action of said jaws upon said work piece when said movable carrier member is moved toward the work and to cause said work piece to be held rigidly without distortion in its prelocated position.

12. In a chuck adapted to grip a precentered work piece in a lathe, a rotatable chuck body, a series of compensating plungers, movable relative to said work piece, mounted in said chuck body, a clamp movable relative to said work piece mounted on said chuck body, a series of compensating plungers movable relative to said work piece and said first mentioned series of plungers, means for moving said clamp relative to said work piece, and inter-connecting means between said plungers whereby equalizing gripping action of said plungers upon said work piece may be affected upon moving said clamp toward said work piece whereby said work piece may be rigidly held and rotated in its prelocated position.

13. In a chuck adapted to grip a precentered work piece in a lathe, a rotatable chuck body, a series of compensating plungers, movable relative to said work piece, mounted in said chuck body, a chamber formed by portions of said series of plungers and said chuck body, a clamp, movable relative to said work piece, mounted on said chuck body, a second series of compensating plungers movable relative to said work piece, said clamp, and said first mentioned series of plungers, a chamber formed by portions of said second series of plungers and said clamp, means for moving said clamp toward said work piece, a medium in said chambers, capable of adapting itself to all shapes of said chambers, acting as a rigid abutment, and inter-connecting means between said chambers whereby equalizing and compensating action is affected between said plungers and said work piece to thereby rigidly support and drive said work piece in true precentered position.

14. In a chuck adapted to grip a precentered work piece in a lathe, a rotatable chuck body, a series of compensating plungers, movable relative to said work piece, mounted in said chuck body, a chamber formed by portions of said series of plungers and said chuck body, a clamp, movable relative to said work piece, mounted on said chuck body, a second series of compensating plungers movable relative to said work piece, said clamp, and said first mentioned series of plungers, a chamber formed by portions of said second series of plungers and said clamp, means for moving said clamp toward said work piece, a medium in said chambers capable of adapting itself to all shapes of said chambers, inter-connecting means between said chambers whereby equalizing and compensating action is affected between said plungers and said work piece, and means for rendering said equalizing and compensating action ineffective whereby said work piece may be rigidly supported and driven in true precentered position.

15. A gripping device comprising jaws movable relative to each other, each of said jaws comprising individually movable gripping elements and a carrier means therefore, a chamber formed by portions of said gripping elements and of said carrier means, and a medium in said chamber capable of adapting itself to all shapes of said chamber, inter-connecting means for the chambers of said jaws to permit flow of said medium between said chambers, and means for locking said gripping elements against movement in said carrier means.

16. A gripping device comprising jaws movable relative to each other, each of said jaws comprising individually movable gripping elements and a carrier means therefor, a chamber formed by portions of said gripping elements and of said carrier means, and a medium in said chamber capable of adapting itself to all shapes of said chamber, acting as a rigid abutment, inter-connecting means for the chambers of said jaws to permit flow of said medium between said chambers, and means for locking the plungers against movement in at least one of said carriers.

17. In a crankshaft chuck, means for supporting and driving a precentered crankshaft by means of its rough irregular web, a rotatable chuck body, a series of compensating plungers mounted in said body to one side of the axis of rotation of the chuck adapted to engage said web, a clamp pivotally mounted on said chuck body and adapted to be swung to or from the axis of rotation of the chuck for loading or unloading the work in the chuck, a latch pivotally mounted on said chuck body having means whereby said clamp may be urged toward a work piece in the chuck, a series of compensating plungers mounted in said clamp engaging said web from the opposite side of the axis of rotation of the chuck from that of said first mentioned series of plungers, chambers formed by said plungers and said chuck body and clamp, a medium in said chambers, capable of adapting itself to all shapes of said chambers, acting as a rigid abutment, and inter-connecting means to permit flow of said medium between said chambers.

18. In a center drive crankshaft chuck, a ring gear having an axial bore, a series of compensating plungers mounted in said bore to one side of the axis of rotation of said chuck, a second series of compensating plungers arranged at the opposite side of the axis of rotation of said chuck from said first mentioned series of plungers, and means for engaging both of said series of plungers with a rough irregular web of a crankshaft so as to rigidly support and drive said crankshaft in accurate centered position in the chuck.

19. In a center drive crankshaft chuck, a ring gear having an axial bore, a series of compensating plungers mounted in said bore to one side of the axis of rotation of said chuck, a second series of compensating plungers arranged at the opposite side of the axis of rotation of said chuck from said first mentioned series of plungers, means for engaging both of said series of plungers with a rough irregular web of a crankshaft so as to rigidly support and drive said crankshaft in accurate centered position in the chuck, and means for bodily moving one of said series away from said web engaging position to facilitate loading and unloading a crankshaft in the chuck.

20. In a center drive crankshaft chuck, a ring gear having an axial bore, a series of compensating plungers mounted in said bore to one side of the axis of rotation of said chuck, a second series of compensating plungers arranged at the opposite side of the axis of rotation of said chuck from said first mentioned series of plungers, means for engaging both of said series of plungers with a rough irregular web of a crankshaft so as to rigidly support and drive said crankshaft in accurate centered position in the chuck, and means to lock some of said plungers against compensating movement.

21. In a chuck, a rotatable chuck body, work engaging plungers mounted in said chuck body to one side of the axis of rotation of said chuck, a chamber containing a compensating pressure receiving medium behind said plungers, a clamp mounted on the other side of said axis for movement bodily relative to said axis, work engaging plungers mounted in said clamp, a chamber containing a compensating pressure receiving medium behind said last mentioned plungers, and means connecting said clamp to the medium in said first mentioned chamber whereby the position of said clamp relative to a work piece in the chuck is determined by the position assumed by the plungers when pressure is applied to the medium in said second mentioned chamber.

WILLIAM F. GROENE.
HAROLD J. SIEKMANN.